United States Patent Office 3,381,176
Patented Apr. 30, 1968

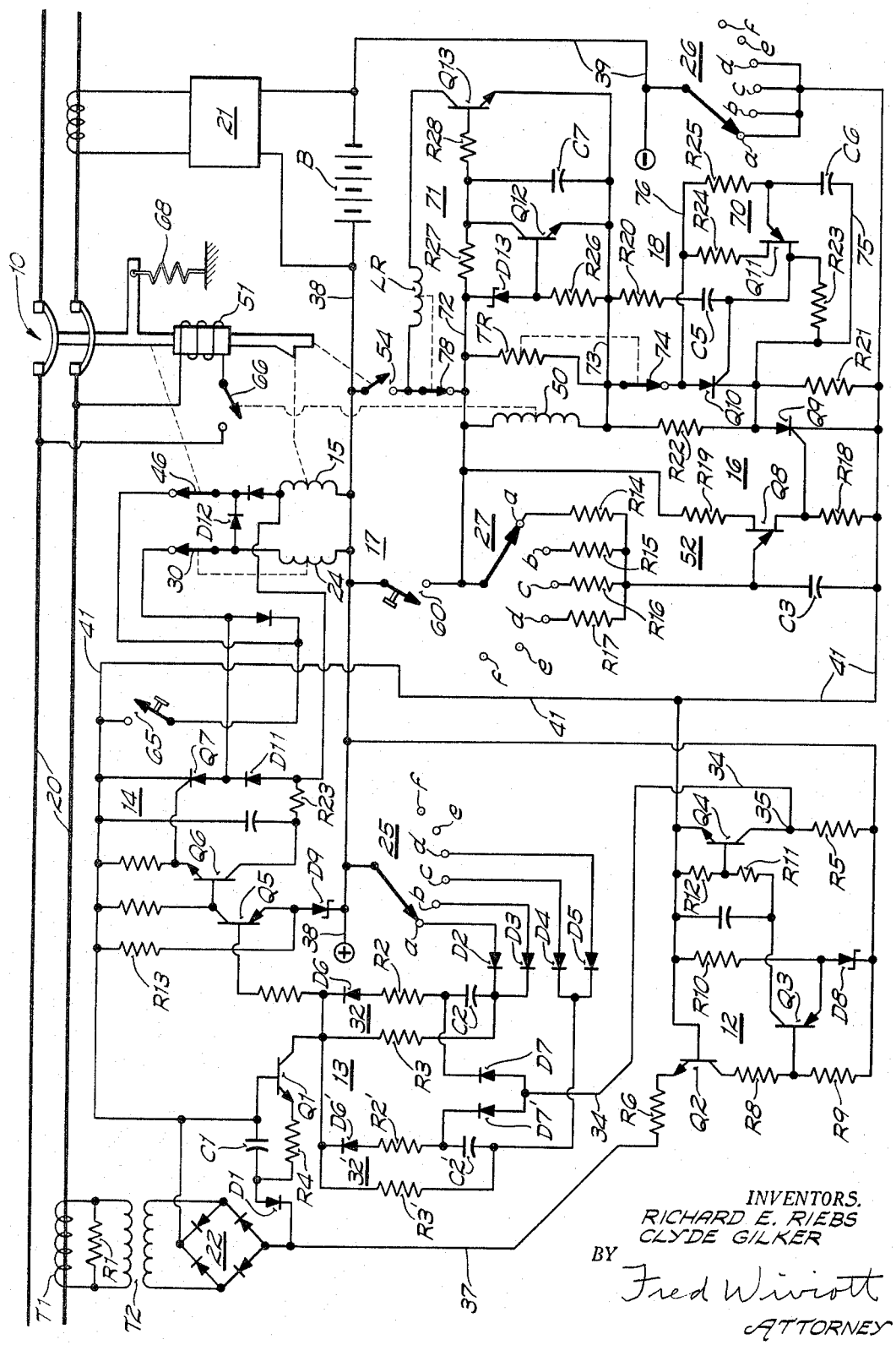

3,381,176
REPEATING CIRCUIT INTERRUPTER INCLUDING PROTECTION MEANS FOR THE SECONDARY SOURCE
Richard E. Riebs, Hales Corners, and Clyde Gilker, South Milwaukee, Wis., assignors to McGraw-Edison Company, Milwaukee, Wis., a corporation of Delaware
Filed Mar. 25, 1966, Ser. No. 537,451
18 Claims. (Cl. 317—22)

This invention relates to repeating circuit interrupters and, more particularly, to means for protecting the low voltage power supply in the control of a repeating circuit interrupter.

A repeating circuit interrupter or recloser may be characterized as a circuit protective device having abnormal condition sensing means connected to the system being protected and responsive to an abnormal circuit condition to initiate a switch opening operation. Reclosers also include switch reclosing means operable after each opening operation, opening and reclosing time delay means and sequencing means which is operable to initiate the various functions and to prevent reclosing after a predetermined number of opening operations.

One type of prior art repeating circuit interrupter is provided with voltage responsive motive means energizable by line voltage for closing the main interrupting contacts. A switch closing operation is initiated in such interrupters by a control mechanism which is energized from a low voltage source, such as a battery. It is common practice in certain systems for a plurality of such reclosers to be connected in series circuit relation. This may result in the situation where a recloser is opened but not locked out while a series connected recloser closer to the source has locked out to interrupt line voltage. Under such circumstances, the battery operated control may remain continuoulsy connected to the battery in a futile attempt to perform a reclosing operation wherein it is possible for the battery or other low voltage source to run down and become permanently damaged.

It is an object of the invention to provide means for protecting the low voltage power supply of a repeating circuit interrupter.

Another object of the invention is to provide means for preventing a continuous drain on the low voltage power supply of a repeating circuit interrupter as a result of the loss of closing energy.

A further object of the invention is to provide an undervoltage protective means for the low voltage power supply of a repeating circuit interrupter.

These and other objects and advantages of the instant invention will become more apparent from the detailed description thereof taken with the accompanying drawing which schematically illustrates a repeating circuit interrupter incorporating the instant invention.

In general terms, the invention comprises a repeating circuit interrupter including switch opening and closing means, electroresponsive means for coupling the switch closing means to the primary energy source, secondary electrical energy source means, control means operative to initiate the flow of operating energy from the secondary energy source means to the electroresponsive means after a switch opening operation to initiate a switch closing operation and to interrupt the energy flow upon a switch closing operation, and time delay means for interrupting the flow of operating energy from the secondary energy source means to the electroresponsive means if a switch closing operation does not occur within a predetermined interval.

The invention may also include means for reestablishing the flow of operating energy after a second predetermined interval which is substantially longer than the first interval.

In addition, the invention may include energy level responsive means for uncoupling the electroresponsive means from the secondary energy source means when the energy level thereof falls below a predetermined value.

Referring now to the drawing in greater detail, the illustrated repeating circuit interrupter or recloser is shown to have a main interrupting switch 10, an overload sensing circuit 12, a timing circuit 13, an output circuit 14, switch opening means 15, switch closing means 16, sequencing means 17, and a low voltage power supply protective circuit 18.

The various portions of the repeating circuit interrupter will be discussed in greater detail hereinbelow, it being sufficient at this point to state that when a predetermined overcurrent is sensed by the overcurrent sensing circuit 12, a signal is provided to the timing circuit 13 which then initiates a timing operation, and, after a predetermined interval provides a signal to the output circuit 14 which then actuates the switch opening means or trip coil 15 so that interrupting switch 10 will be moved to its open position. Upon this event, the reclosing means 16 is made operable to return the interrupting switch 10 to its closed position. The sequencing means 17, performs the operation counting and lockout functions and insures the desired sequence of opening and reclosing operations.

Low voltage power is supplied to the repeating circuit interrupter control by a battery B which is normally kept charged from the system 20 by any suitable means 21, such as that shown in U.S. Patent 3,116,439 which is assigned to the assignee of the instant invention.

For a more complete description of the circuit breaker operating mechanism usable with the illustrated control mechanism, reference is made to copending application Ser. No. 325,215 filed Nov. 21, 1963, and assigned to the assignee of the instant invention.

Before continuing with the discussion of the various circuit portions mentioned above, the operation of the sequencing means 17 will be discussed briefly. The sequencing means is schematically illustrated to include a stepping relay coil 24 and step switches 25, 26 and 27, although any well-known type of mechanical or static stepping device may be employed. The sequencing means 17 is sequentially operable to a plurality of stages, symbolized by a movable wiper and taps or stages $a$–$f$ for each of the step switches. Each time the coil 24 is energized, it is operable to simultaneously advance each wiper one tap from $a$–$f$ and back to $a$. While it may appear from the schematically illustrated step switches that the circuit through each will be momentarily opened when their respective wipers are between positions, in actual practice the switches are of the type wherein the wiper bridges over to the next contact before moving off to the previous one so that circuit integrity is maintained. For this reason, contacts 30 are provided in the coil 24 energizing circuit and are arranged to open and reclose each time the coil 24 advances the step switches so that coil 24 will be deenergized and drop out in preparation for a succeeding stepping operation.

Referring again to the overcurrent sensing circuit 12, the timing circuit 13 and the output circuit 14, these are shown to be coupled to the system 20, by the current transformer T, a resistor R1 and the full wave rectifier 22 whose output terminals are connected across a capacitor C1 and a diode D1. As a result, a voltage will appear across capacitor C1 which is proportional to the current flowing in the system 20.

The timing circuit 13 includes a first timing circuit portion 32 connected through isolating diodes D2 and D3 to taps $a$ and $b$ respectively of stepping switch 25 and a second timing circuit portion 32' connected through isolating diodes D4 and D5 to taps $c$ and $d$ of said switch. The timing circuit portions 32 and 32' are identical except for the size of their components which determine their time delay characteristics and, accordingly, only timing circuit portion 32 will be discussed in detail for the sake of brevity.

Timing circuit portion 32 is shown to include a timing capacitor C2 connected in series with a timing resistor R2 and a diode D6 and the series combination connected in parallel with a second timing resistor R3. As has been fully discussed in copending application Ser. No. 800,567 filed Mar. 19, 1959, and assigned to the assignee of the instant invention, the impedance values of capacitor C2 and resistors R2 and R3 determine the charging time for any given fault current in the system 20. Under normal operating conditions, the tap switch 25 will be initially connected to tap $a$ so that timing circuit 32 will be operable during the first opening operation.

A transistor Q1 couples the time delay circuit 13 to the capacitor C1, wherein its collector is connected to the timing circuits 32 and 32' while its base is connected to one terminal of capacitor C1 and its emitter is connected to the other terminal thereof through resistor R4. As a result, the current flowing to the collector of transistor Q1, which is a function of the voltage across capacitor C1, will split between the parallel paths defined by the resistor R3 and the series combination of timing resistor R2 and capacitor C2.

When there is no fault in the system 20, capacitor C2 is prevented from charging because it is shunted by a leakage resistor R5 located in the overload current sensing portion 12 and to which it is connected by a diode D7 and conductor 34. As a result of this leakage current, the terminal 35 of resistor R5 will have some positive potential.

Turning now to the overcurrent sensing circuit 12, it is shown to include a transistor Q2 whose emitter is connected to one output terminal of full wave rectifier 22 through resistor R6 and conductor 37 such that its emitter current flowing through resistors R8 and R9 to the positive bus 38 will also be proportional to the peak current in the system 20. The base of a second transistor Q3 is connected to the junction between resistors R8 and R9 while its emitter is held at a constant potential by a Zener diode D8 and a resistor R10 connected in series between the positive bus 38 and a conductor 41 which is normally connected to the negative bus 39 through step switch 26. Thus, by a proper selection of components, transistor Q3 can be considered as a level detector which is rendered conductive when the current in the system 20 equals or exceeds the desired minimum actuating current for the device.

Upon the occurrence of an overcurrent in the system 20, the emitter of Q3 will become sufficiently positive relative to its base so that electric current will flow to the negative bus 39 through resistors R11 and R12. This provides a base signal to transistor Q4 which then becomes conductive to connect terminal 35 of resistor R5 to the negative bus 39. This, in turn, causes terminal 35 to assume a negative potential so that leakage current can no longer flow from capacitor C2. As a result, timing capacitor C2 is prevented from discharging through leakage resistor R5 and, therefore, begins charging. In this manner, the timing operation is initiated. Diode D7 performs the function of preventing reverse current flow from terminal 35 to the capacitor C2.

The output circuit portion 14 includes a second level detecting transistor Q5 whose base is connected to the junction between the collector of transistor Q1 and timing circuit 32 and whose emitter is held at a constant potential by a Zener diode D9 and a resistor R13 which are connected in series between the positive bus 38 and conductor 41. The emitter of transistor Q5 is connected to the base of a switching transistor Q6 whose emitter, in turn, is connected to the gate of a silicon controlled rectifier Q7. The anode and cathode of Q7 are connected in series circuit relation with a diode D11 and the trip coil 15 and the series combination is connected between positive bus 38 and conductor 41.

After timing capacitor C2 has charged for a predetermined time, which is the time delay for the first operation of the device, the potential at junction 40 will reach the point where transistor Q5 is rendered conductive which, in turn, makes the base of transistor Q6 more positive than its emitter so that Q6 will also become conductive to provide a gate signal to control rectifier Q7. Upon this event, Q7 will become conductive to complete an energizing circuit to trip coil 15 which then opens the main switch 10 in a manner well known in the art. When the main switch 10 reaches its fully opened position, contacts 46, connected in series therewith will be opened to de-energize trip coil 15 and render silicon controlled rectifier Q7 nonconductive.

The stepping relay 24, which is connected in parallel with trip coil 15, will also be energized when silicon controlled rectifier Q7 is rendered conductive so that each of the step switches 25, 26 and 27 will be moved to their $b$ taps. As a result, the time delay circuit portion 32 will also be effective during the second switch opening operation. Should the fault persist, requiring a third and a fourth opening operation, the switch 25 will be moved to taps $c$ and $d$ so that time delay circuit portion 32' will be effective whereby the third and fourth opening operations may have a longer time delay than the initial operations.

The reclosing circuit 16 includes a closing coil 50 for completing an energizing circuit to a closing solenoid 51 mechanically coupled to the main switch 10 and a closing time delay circuit 52 which includes four resistors R14, R15, R16 and R17 each of which has one terminal connected to taps $a$, $b$, $c$ and $d$ respectively of step switch 27. In addition, the closing time delay circuit 52 also includes a capacitor C3 connected between conductor 41 and the other terminals of resistors R14–R17. The emitter electrode of a unijunction transistor Q8 is connected to the junction 55 between capacitor C3 and resistors R14–R17 while its base-one electrode is connected through resistor R18 to conductor 41 and its base-two electrode is connected through resistor R19 to contacts 54, the latter of which are coupled to the main switch 10 and which are opened when said main switch is closed and which are closed when the main switch is opened. The closing time delay circuit 52 also includes a silicon controlled rectifier Q9 whose gate electrode is connected to the base-one electrode of unijunction transistor Q8 and whose anode and cathode electrodes are connected in series with the closing coil 50 and the series combination is connected to conductor 41 and the positive bus 38 through contacts 54. Also connected in series between SCR Q9 and closing coil 50, is the battery protection circuit 18 whose purpose and function will be discussed in greater detail hereinbelow. It will be sufficient at present to state that when SCR Q9 is rendered conductive, an energizing circuit will be established through closing coil 50.

It will be recalled that upon the initial operation of the repeating circuit interrupter, each of the step switches 25–27 will be on tap $a$. When the trip coil 15 is energized in the manner discussed hereinabove, the stepping relay coil 24 will also be energized to advance each of the step switches 25–27 to their $b$ taps. When the switch 10 reaches its fully opened position, contacts 54 will close to complete an energizing circuit to capacitor C3 through resistor R15 and step switch 26. After a time delay, determined by the relative sizes of resistor R15 and capacitor C3, the junction 55 therebetween will reach the breakover potential of unijunction transistor Q8. This will cause current flow through the emitter-base-one circuit of Q8 to provide a gate signal to silicon controlled rectifier Q9 which then becomes conductive to complete an energizing circuit through closing coil 50 whereby contacts 66 are closed to place the closing solenoid 51 across the line 20. Assuming that line voltage exists, solenoid 51 will close and relatch the main contacts 10 and extend the opening spring 68 in a manner well known in the art. Upon the latter event, auxiliary contacts 54 open to de-energize closing coil 50 and to interrupt the anode current to unijunction transistor Q9 which then becomes nonconductive.

Should the fault in system 20 reappear when the main switch 10 is reclosed, this will again be sensed by the overcurrent sensing circuit 12 which initiates a second timing operation by timing circuit portion 32 so that trip coil 15 will be energized to open the main switches 10 and the stepping relay coil 24 will advance each of the step switches 25–27 to their c taps. When the main switch 10 opens for a second time, capacitor C3 will be charged through resistor R16 so that controlled rectifier Q9 will become conductive after a second time delay to energize the closing coil 50 and initiate a second closing operation. Similarly, should the fault persist after the second reclosing operation, trip coil 15 will be energized after a relatively long time delay dictated by time delay circuit 32' to again open the main switch 10. In a like manner, after the third opening operation, the stepping relay coil 24 will move each of the step switches 25–27 to their d taps whereupon closing coil 50 will be energized as a result of the charging of capacitor C3 through resistor R17. If the fault continues after the third closing operation, trip coil 15 will again be energized to open the main switch 10 and stepping relay coil 24 will advance each of the step switches 25–27 to their e taps.

It can be seen that because the taps e of switches 26 and 27 are open-circuited, closing coil 50 will remain de-energized even though contacts 54 are closed when the main switch 10 is open. As a result, the main switch will not reclose. In this manner, the recloser is locked in open position after a predetermined number of opening and closing operations.

Resetting of the recloser after it has been locked open in the manner described above, is accomplished by means which are not shown, but which are well known in the art, such as that shown in copending application Ser. No. 488,371, assigned to the assignee of the instant invention.

If it is desired to initiate a manual switch opening operation, manual contacts 65, which are connected in parallel with control rectifier Q7 of the output circuit 14, are closed to immediately energize the trip coil 15 whereby the main switch 10 is opened. The closing of switch 65 also energizes the stepping relay coil 24 which causes each of the step switches 25–27 to advance to their b taps. In addition, contacts 30, in series with stepping relay coil 24, open and close so that coil 24 drops out and is then re-energized to advance step switches 25–27 to their next taps and so on until coil 24 becomes open-circuited by tap e of step switch 26.

Step switch 26 is provided to de-energize each of the portions of the circuit except the reset circuit 18 whenever the recloser is in its lockout position wherein switch 26 is on tap e.

The foregoing discussion of the repeating circuit interrupter is essential to the understanding of the invention discussed hereinbelow.

It will be recalled that when closing coil 50 became operative to close contacts 66, the closing solenoid 51 is placed across the line 20. This is normally operative to reclose the main contacts 10 which, in turn, open contacts 54 in series with closing coil 50 so that the latter will be disconnected from the battery 10.

Should the voltage disappear from the line 20 as a result of the opening of another repeating circuit interrupter closer to the source, the main switch 10 will remain open when contacts 66 are closed. This, in turn, will result in contacts 54 remaining closed so that the closing coil 50 is not disconnected from the battery B. In order to insure that closing coil 50 will not place a continuous drain on the battery B, the battery protection circuit 18 includes a first section 70 for periodically coupling and uncoupling the closing coil 50 and the battery B. Each time the closing coil 50 is energized, it will close contacts 66 to attempt a switch closing operation. If the voltage has, in the meantime, returned to line 20, the main switch 10 will close to open contacts 54. However, if the voltage has not returned, the first section 70 of the battery protection circuit 18 will disconnect coil 50 from the battery B for a predetermined period whereupon a subsequent attempt at a switch closing operation will be made.

Battery protection circuit 18 also includes a second section 71 for open-circuiting the closing coil 50 when the battery voltage falls below a predetermined minimum value to prevent permanent battery damage.

The first section 70 of the battery protection circuit 18 includes a thermal relay having a current responsive portion symbolized by a heater TR connected by conductors 72 and 73 in shunt with closing coil 50 and a silicon controlled rectifier Q10 whose anode-cathode circuit is connected in series with the anode and cathode of the closing SCR Q9. The contacts 74 of the thermal relay connect the SCR's Q9 and Q10 to the closing coil 50 and to the thermal relay heater TR. The gate of SCR Q10 is connected to conductor 73 through capacitor C5 and a resistor R20. In addition, a first resistor R21 is connected in shunt with the anode-cathode circuit of SCR Q9 and a second resistor R22 is connected in shunt with the anode-cathode circuit of SCR Q10 and the thermal relay contacts 74.

The first section 70 of battery protection circuit 18 also includes a unijunction transistor Q11 having its base-one-electrode connected to the gate of SCR Q9 and through resistor R23 and conductor 75 to the cathode of SCR Q10. The base-two-electrode of unijunction transistor Q11 is connected through resistor R24 and conductor 76 to the anode of SCR Q10. In addition, the emitter of unijunction transistor Q11 is connected to conductor 75 by capacitor C6 and to conductor 76 through resistor R25.

The second section 71 of battery protection circuit 17 includes the coil LR of a latching relay whose contacts 78 are connected in series between the contacts 54 and closing coil 50. In addition, the second section 71 includes a first transistor Q12 whose base is connected to the junction between a Zener diode D13 and a resistor R26 which are, in turn, connected in series between conductors 72 and 73. The emitter of transistor Q12 is connected to conductor 73 and its collector is connected to conductor 72 through resistor R27. The second section 71 also includes a second transistor Q13 whose base is connected to the collector of transistor Q12 through resistor R28 and whose emitter-collector circuit connects the latching relay coil LR to conductor 73. Also, a capacitor C7 is connected between the resistor R28 and conductor 73.

It will be recalled that when the switch 10 reaches its fully opened position, contacts 54 will close whereby capacitor C3 will begin charging through one of the resistors R15, R16 or R17 so that after a time delay, the breakover potential of unijunction transistor Q8 will be reached to provide a gate signal to SCR Q9. In addition, the closing of contacts 54 will complete the anode circuit to SCR Q9 through the parallel combination of closing coil 50 and thermal relay heater TR and resistor R22 so that Q9 will become conductive. However, closing coil 50 will not immediately pull in because the relatively large resistor R22 limits the initial current flow below that necessary for operation of coil 50.

The closing of contacts 54 additionally completes a charging circuit for capacitor C5 through closing coil 50 and thermal relay heater TR and resistors R20, R21 and R23. As a result, when SCR Q9 becomes conductive, gate current can flow from capacitor C5 through the gate of SCR Q10 so that the latter becomes conductive to short circuit resistor R22 whereupon the current flow through closing coil 50 will rise to a value sufficient to cause the closing of contacts 66.

Should sufficient line voltage exist in the system 20, the closing solenoid 51 will close the main contacts 10 whereupon contacts 54 will be opened. This disconnects the closing coil 50 from the battery B and interrupts anode current in each of the SCR's Q9 and Q10 so that each will be rendered nonconductive. On the other hand, if there is an absence of line voltage, the closing solenoid 51 will remain inactive so that the main switch 10 will not reclose to open contacts 54. As a result, the closing coil 50 will remain connected to the battery B. After a relatively short period, determined by the characteristics of thermal relay TR, and in the order of one second, current flow through heater TR will be sufficient to open contacts 74. This will interrupt the anode current to SCR Q10 so that relatively large resistor R21 will again be placed in series between the closing coil 50 and the battery B. As a result, current flow from the battery B will fall to a relatively low level thereby eliminating an inordinate battery drain. Thus, in effect, the flow of operating current from the battery B to the closing coil 50 is interrupted. The SCR Q9, however, continues to conduct because its anode current is not interrupted.

The reduction in current flow resulting from the re-insertion of resistor R22 in circuit with closing coil 50 and the thermal relay heater TR causes the latter to cool whereby contacts 74 close. Silicon controlled rectifier Q10 remains nonconductive, however, so that capacitor C6 will begin charging through resistor R25 and conductor 76. After a predetermined time delay, e.g., in the order of 75 seconds, the charge from capacitor C6 will reach the breakover potential of unijunction transistor Q11 which will then become conductive to provide a second gate signal to SCR Q10. This renders SCR Q10 conductive to short circuit resistor R22 causing an increase in current through the closing coil 50 which closes contacts 66 a second time to attempt a switch closing operation. If the voltage has returned to the system 20, the main switch 10 will be closed and contacts 54 open to disconnect the closing circuit from the battery B in the manner discussed hereinabove. However, if the voltage has not as yet returned to the line 20, thermal relay heater TR will again heat up after a relatively short period to open contacts 74 and thereby render SCR Q10 nonconductive so that resistor R22 is reinserted in the circuit. After a subsequent relatively long time delay, SCR Q10 will again be rendered conductive so that another switch closing operation may be attempted. This continues until the main switch 10 is finally closed.

During the switch opening operation just discussed, the voltage appearing across closing coil 50 and thermal relay heater TR is also applied across Zener diode D13 and resistor R26 of the undervoltage protection circuit section 71. A Zener diode is, of course, a device which will break down to allow current in the reverse direction when it is subjected to a greater voltage than its Zener voltage wherein the voltage drop across it is equal to said Zener voltage and remains constant regardless of changes in current flow.

When the battery voltage is above a safe level, the voltage applied across Zener diode D13 and resistor R26 will be sufficient to forward-bias transistor Q12 so that it will be conductive to shunt base current from transistor Q13 which remains nonconductive to open circuit latching relay coil LR.

Should the battery voltage fall below the desired minimum valve, however, wherein further discharge might cause permanent damage, the voltage applied across Zener diode D13 and resistor R26 will fall sufficiently so that substantially all the drop will appear across Zener diode D13. As a result, transistor Q12 will no longer be forward-biased and will become nonconductive. Base current may then flow to transistor Q13 through resistor R28 so that Q13 becomes conductive. This completes an energizing circuit to latching relay coil LR which becomes operative to open its contacts 78 so that the closing circuit is disconnected from the battery B. As a result, further current drain from the battery is prevented. Capacitor C7 serves the function of providing base current to the transistor Q13 for a short period after contacts 78 open so that the latter may be latched.

When contacts 78 open, SCR Q9 is rendered nonconductive to open circuit latching relay coil LR. Contacts 78 remain latched open, however, until manually reset after the battery B has been recharged.

In this manner, the battery B is protected from permanent damage by the closing circuit should the latter be unable to affect a switch closing operation after repeated periodic attempts as the result of a lack of line voltage.

While only a single embodiment of the instant invention has been shown and described, it is not intended to be limited but only by the scope of the appended claims.

We claim:

1. A repeating circuit interrupter including switch means in circuit with an electrical system, control means for opening said switch means upon the occurrence of a predetermined condition in said system, switch closing means coupled to said switch means, primary energy source means for providing switch closing energy, electroresponsive means for coupling said switch closing means to said primary energy source means, secondary electrical energy source means, said control means being operative to initiate the flow of operating energy from said secondary energy source means to said electroresponsive means after a switch opening operation to initiate a switch closing operation, means for interrupting the energy flow from said secondary energy source means to said electroresponsive means when said switch means closes, and time delay means for interrupting the flow of operating energy from said secondary energy source means to said second electroresponsive means if said switch means does not reclose within a predetermined interval.

2. The repeating circuit interrupter set forth in claim 1 wherein said switch closing means comprises electromotive means and said primary energy source means comprises circuit means coupled to said system for deriving potential energy therefrom.

3. The repeating circuit interrupter set forth in claim 1 wherein said time delay means is also operative to re-establish the flow of operating energy after a second predetermined interval which is substantially longer than said first interval.

4. The repeating circuit interrupter set forth in claim 1 wherein said control means also includes energy level responsive means for uncoupling said electroresponsive means from said secondary energy source means when the energy level of said secondary energy source means falls to a predetermined value.

5. The repeating circuit interrupter set forth in claim 1 wherein said secondary energy source means comprises a battery.

6. The repeating circuit interrupter set forth in claim 2 wherein said time delay means is operative to re-establish said flow of operating energy after a second predetermined interval which is substantially longer than said first interval.

7. The repeating circuit interrupter set forth in claim 3 wherein said control means includes energy level responsive means for uncoupling said electroresponsive means from said secondary energy source means when the energy level of said secondary energy source means falls to a predetermined value.

8. The repeating circuit interrupter set forth in claim 3 wherein said time delay means includes first means coupled to said electroresponsive means and responsive to the flow of operating energy thereto for interrupting said flow after said first interval and second means coupled to said electroresponsive means and responsive to the interruption of said flow for re-establishing said flow after said second interval.

9. The repeating circuit interrupter set forth in claim 3 wherein said control means includes first and second switching circuit means and first and second circuit means for respectively rendering said first and second switching circuit means effective upon the opening of said switch means, said first and second switching circuit means being operative when effective to accomplish said energy flow, said time delay means having a first delay portion for rendering said second switching circuit means ineffective after said first interval and a second delay portion for rendering said second switching circuit means effective after said second interval.

10. The repeating circuit interrupter set forth in claim 6 wherein said time delay means includes first means coupled to said electroresponsive means and responsive to the flow of operating energy thereto for interrupting said flow after said first interval and second means coupled to said electroresponsive means and responsive to the interruption of said flow for re-establishing said flow after said second interval.

11. The repeating circuit interrupter set forth in claim 6 wherein said control means includes first and second switching circuit means and first and second circuit means for respectively rendering said first and second switching circuit means effective upon the opening of said switch means, said first and second switching circuit means being operative when effective to accomplish said energy flow, said time delay means having a first delay portion for rendering said second switching circuit means ineffective after said first interval and a second delay portion for rendering said second switching circuit means effective after said second interval.

12. The repeating circuit interrupter set forth in claim 8 and including relatively large impedance means, said first means being operative to place said impedance means in a series circuit relation with said electroresponsive means and said second means being operative to remove said impedance means from said series circuit relation.

13. The repeating circuit interrupter set forth in claim 9 and including relatively large impedance means in a series circuit relation with said electroresponsive means, said second switching circuit means being operative to remove said impedance means from said series circuit relation.

14. The repeating circuit interrupter set forth in claim 10 wherein said secondary energy source means comprises a battery and said control means includes undervoltage means for uncoupling said electroresponsive means from said battery means when the output voltage level thereof falls to a predetermined value.

15. The repeating circuit interrupter set forth in claim 10 and including relatively large impedance means, said first means being operative to place said impedance means in a series circuit relation with said electroresponsive means and said second means being operative to remove said impedance means from said series circuit relation.

16. The repeating circuit interrupter set forth in claim 10 wherein said secondary energy source means comprises a battery and said first means comprises current responsive means.

17. The repeating circuit interrupter set forth in claim 15 wherein said control means includes energy level responsive means for uncoupling said electroresponsive means from said secondary energy source means when the energy level of said secondary energy source means falls to a predetermined value.

18. The repeating circuit interrupter set forth in claim 16 wherein said time delay means includes contacts wherein said current responsive means is operative to open said contacts after said first interval and to close said contacts prior to said second interval and including gate means connected to said contacts and becoming nonconductive when said contacts open, said second means comprising time delay circuit means coupled to said gate means and operative after said second interval to render said gate means conductive.

References Cited

UNITED STATES PATENTS

| | | | |
|---|---|---|---|
| 2,745,971 | 5/1956 | Robertson | 317—22 X |
| 3,043,989 | 7/1962 | Nash et al. | 317—22 |
| 3,100,854 | 8/1963 | Riebs | 317—22 |
| 3,116,439 | 12/1963 | Riebs | 317—22 |
| 3,295,017 | 12/1966 | Riebs et al. | 317—22 |

MILTON O. HIRSHFIELD, *Primary Examiner.*

R. V. LUPO, *Assistant Examiner.*